(12) United States Patent
Sriram

(10) Patent No.: US 7,009,311 B1
(45) Date of Patent: Mar. 7, 2006

(54) METHOD FOR MINIMIZING GENERATOR LOAD ON INTERNAL COMBUSTION ENGINE

(75) Inventor: Tillasthanam V. Sriram, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/924,607

(22) Filed: Aug. 24, 2004

(51) Int. Cl.
*F02N 11/04* (2006.01)
*F02N 11/08* (2006.01)

(52) U.S. Cl. ............... 290/36 R; 290/37 R; 290/36 A
(58) Field of Classification Search .................. None
See application file for complete search history.

(56) References Cited

U.S. PATENT DOCUMENTS

| | | | | |
|---|---|---|---|---|
| 4,459,536 A | * | 7/1984 | Wirtz | 322/10 |
| 4,803,376 A | * | 2/1989 | N'Guyen | 290/22 |
| 4,825,149 A | | 4/1989 | Hamelin et al. | 322/90 |
| 4,959,595 A | * | 9/1990 | Nishimura | 318/138 |
| 5,065,086 A | * | 11/1991 | Takakado | 322/10 |
| 5,352,929 A | | 10/1994 | Kohl et al. | 290/36 R |
| 5,998,976 A | * | 12/1999 | Steffan | 322/10 |
| 6,353,307 B1 | | 3/2002 | Koelle et al. | 322/59 |
| 6,392,311 B1 | * | 5/2002 | Inaba et al. | 290/38 R |
| 6,771,040 B1 | * | 8/2004 | Kusumoto et al. | 318/801 |
| 2001/0006292 A1 | * | 7/2001 | Inaba et al. | 290/38 R |

FOREIGN PATENT DOCUMENTS

| | | | |
|---|---|---|---|
| DE | 19928106 C1 | * | 11/2000 |
| EP | 0260176 | | 3/1988 |
| FR | 2860108 A1 | * | 3/2005 |
| JP | 04203471 A | * | 7/1992 |
| JP | 2005133646 A | * | 5/2005 |

OTHER PUBLICATIONS

EP 05 07 6800 European Search Report dated Oct. 27, 2005.

* cited by examiner

*Primary Examiner*—Joseph Waks
(74) *Attorney, Agent, or Firm*—Jimmy L. Funke

(57) ABSTRACT

A method is disclosed for starting a generator (10) from an internal combustion engine (14) to allow the generator (10) to charge a battery (32). The generator (10) includes a field bridge (36), having first (72) and second (74) switches, and a multiphase inverter (30), having upper (60, 62, 64) and lower (66, 68, 70) halves of switches. The method includes the step of providing a voltage from the battery (32) to the internal combustion engine (14). The voltage is used to crank the internal combustion engine (14). The first (72) and second (74) switches are closed to conduct and maximize the field current in the generator (10). The method includes the step of identifying when the internal combustion engine (14) is transitioning from a cranking state to an idling state. The method then switches the first (72) and second (74) switches off to decrease the field current to zero. The method also turns the lower half of the switches (66, 68, 70) of the multiphase inverter on to quicken the decrease of the field current in the generator (10) to zero. This further reduces the amount of power consumed by the generator (10) to allow the internal combustion engine (14) to reach its idling state.

5 Claims, 2 Drawing Sheets

METHOD FOR MINIMIZING GENERATOR LOAD ON INTERNAL COMBUSTION ENGINE

BACKGROUND ART

1. Field of the Invention

The invention relates to a method for minimizing the load on an internal combustion engine during the starting thereof. More particularly, the invention relates to a method of reducing the drag attributed to a starter-alternator when an internal combustion engine is started.

2. Description of the Related Art

Typically, an internal combustion engine is started initially from an electrical potential. Because an internal combustion engine is often used with a motor vehicle, the electrical potential comes from a battery. The battery needs to be charged shortly after the internal combustion engine is started because much of the potential stored in the battery is consumed during the starting of the internal combustion engine.

To solve this problem, an alternator/generator is driven by the internal combustion engine. This alternator is used as a generator to generate electricity to charge the battery. Starting the alternator/generator at the time the internal combustion engine is starting creates an additional drag on the internal combustion engine. This drag is perceived by the operator of the internal combustion engine and is undesirable and so it is not done.

More recently, the functions of the starter and the alternator have been combined into a single starter-alternator. With these assemblies, the same device that is used to start the internal combustion engine is the same device that charges the battery once the internal combustion engine has been started. One problem with such devices is these starter-alternators put a drag on the internal combustion engine that is perceptible by the operator of the motor vehicle.

In order to crank the engine with the starter-alternator, its field coil windings are energized with full field current at the same time as its stator windings are energized. This produces the needed torque to start the internal combustion engine. As the engine starts with fuel and spark and accelerates to idle speed, the starter-alternator begins to generate electricity and charges the battery. This results in a significant extra load on the battery that aggravates the feel of the starting process. This is not a problem with traditional cranking motors and alternators where the alternators are energized only after achieving idle speed.

This problem has been addressed in some internal combustion engine systems by forcing the field current to rapidly decrease to zero soon after a successful engine crank has been accomplished. This is done by means of a half bridge on a field circuit. This scheme provides a good starting response. The drag on the engine from the alternator still exists, however, for a brief moment when the field current is high from the cranking event and in the early park of its rapid decent to zero current.

SUMMARY OF THE INVENTION

A method is disclosed for starting an alternator from an internal combustion engine to allow the alternator to charge a battery. The alternator includes a field bridge, having first and second switches, and a multiphase inverter, having upper and lower halves of switches. The method includes the step of providing a voltage from the battery to the internal combustion engine. The voltage is used to crank the internal combustion engine. The first and second switches are closed to conduct and maximize the field current in the alternator. The method then switches the first and second switches off to decrease the field current to zero when the internal combustion engine has transitioned from a cranking state to an idling state. The method also turns the lower half of the switches in the multiphase inverter so as to short the stator windings and divert the current from going into the battery. The effect is a reduced mechanical load on the internal combustion engine.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
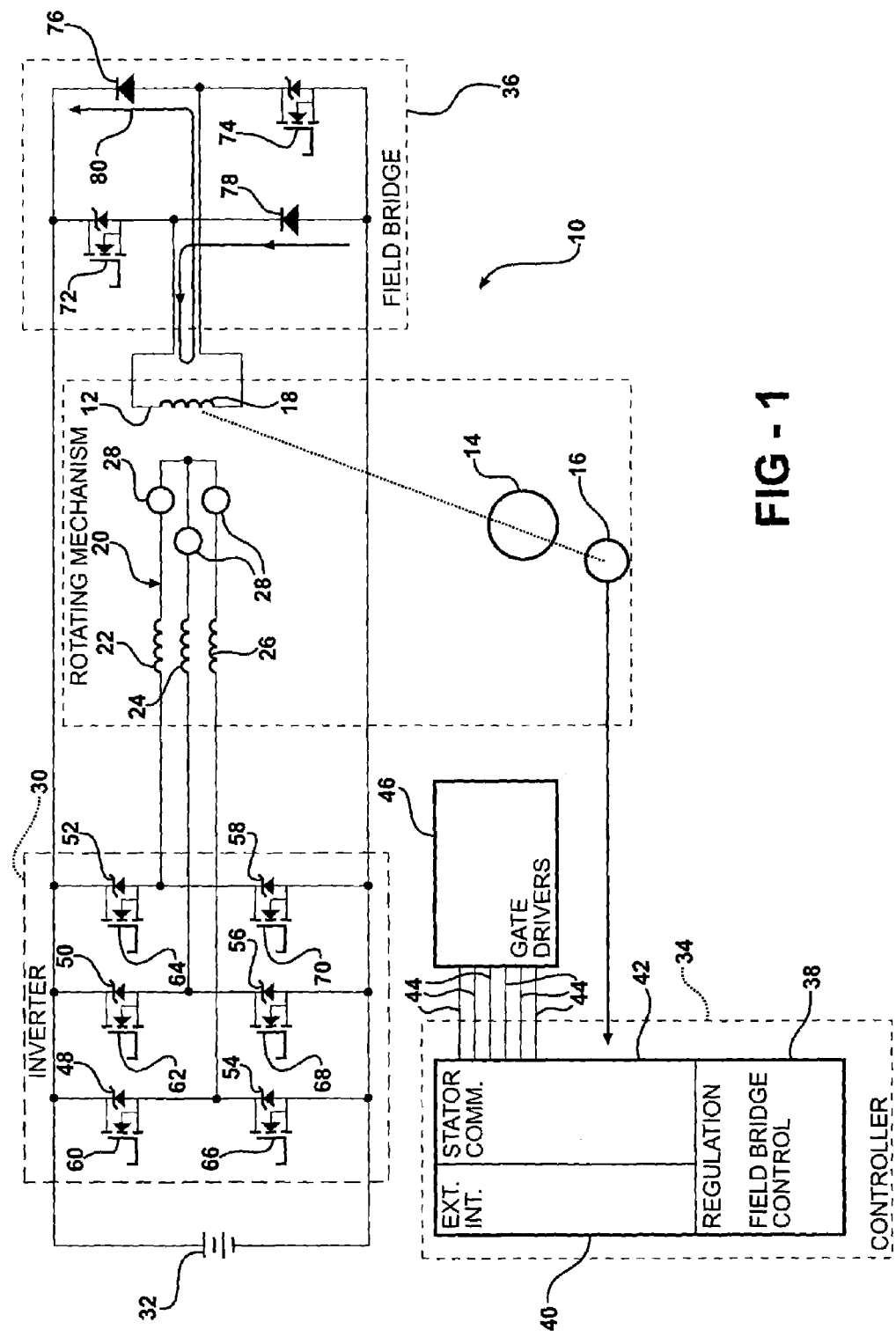
FIG. 1 is a schematic diagram of the alternator and its control circuitry.

Referring to FIG. 1, a schematic drawing of an alternator/generator is generally indicated at 10. The alternator/generator 10 will be referred hereinafter as an alternator 10 for the purpose of simplicity. The alternator 10 includes a rotor 12 that is fixedly secured to a rotating shaft 14. The rotating shaft 14 represents the internal combustion engine that is being started by the alternator 10. Position sensors 16 identify the orientation of the rotating shaft 14 at any given point. The rotor 12 is of standard construction. The rotor 12 includes a rotor coil 18 that is wrapped around a permanent magnet or electromagnet (not shown). A field bridge 36 energizes the rotor coil 18. Rotation of the rotor coil 18 along with the rotating shaft 14 generates a voltage in each of three windings 22, 24, 26 of the stator 20. These voltages are represented by circles 28.

When the rotor 12 generates a current in the stator 20, that current is a three-phase current, each of the three phases created by one of the windings, 22, 24, 26. These currents are received by an inverter 30. The inverter 30 functions as a three-phase rectifier and converts the three phase voltages generated into direct current voltage for delivery to the battery 32. In the example shown, the battery 32 is a 12 Volt battery and the alternator 10 is used in conjunction with an internal combustion engine, graphically represented by the rotating shaft 14, of an automobile.

A controller 34 controls a field bridge 36 and the inverter 30 during operation of the alternator 10. The controller 34 receives an input from the position sensors 16. The controller 34 includes a field bridge controller 38, an external interface 40 and a stator communication sequencing device 42. The stator communication sequencing device 42 includes a plurality of outputs 44 that are received by gate drivers 46. The gate drivers 46 will be discussed in greater detail subsequently.

Returning attention to the inverter 30, two sets of components are used to make up the inverter 30. The first is a set of diodes 48, 50, 52, 54, 56, 58. The diodes 48–58 are standard components in a three-phase inverter such as the inverter 30. The diodes 48–58 provide a path for current to reach the battery 32 while preventing current from reaching the battery 32 at the wrong terminal thereof. The inverter 30 also includes six switches 60, 62, 64, 66, 68, 70. These switches 60, 62, 64, 66, 68, 70 are MOSFETs and are divided, as they are oriented in FIG. 1, as upper half MOSFETs 60, 62, 64 and lower half MOSFETs 66, 68, 70. The MOSFETs 60–70 will be discussed in greater detail subsequently when discussing the inventive method.

Figure 2:
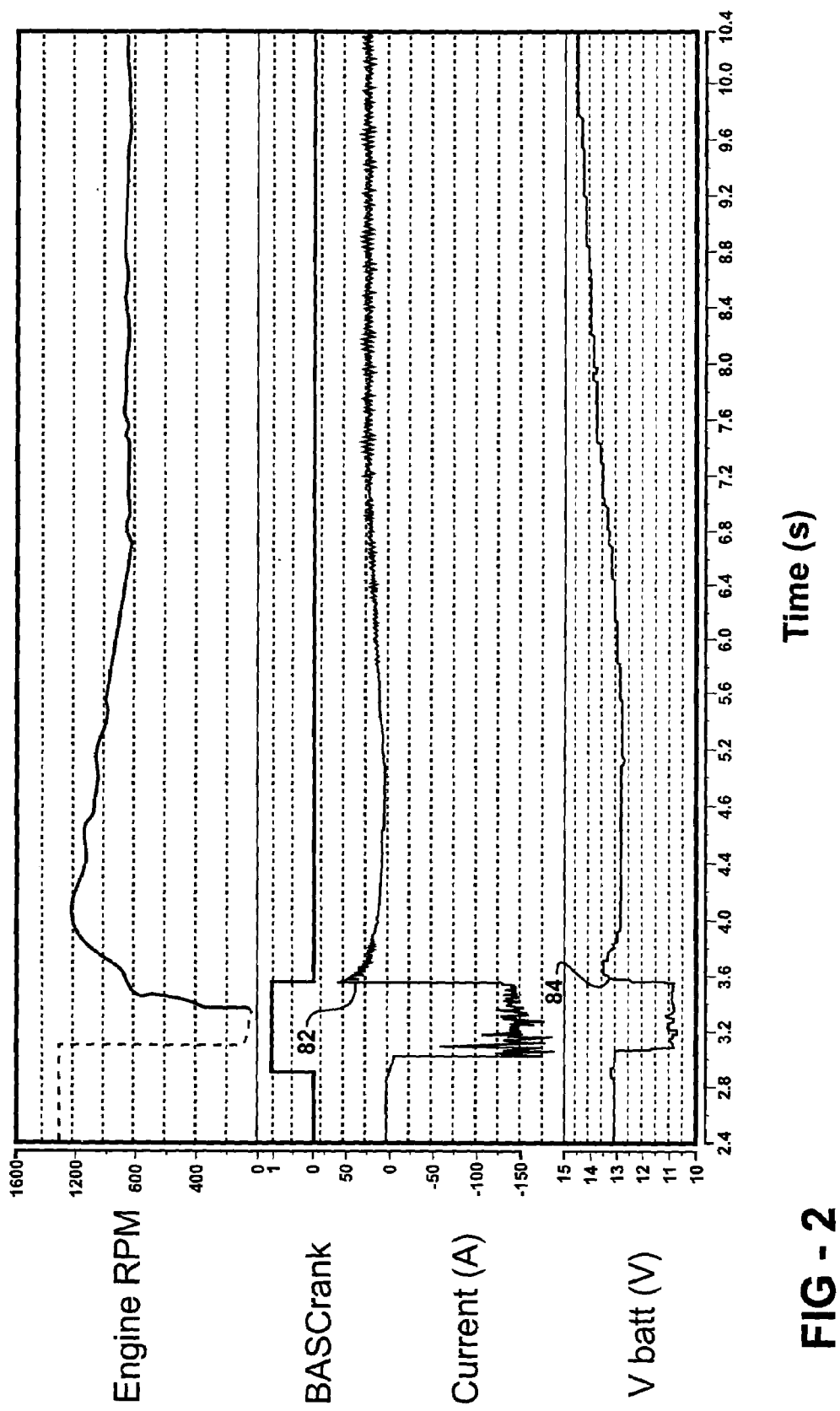
FIG. 2 is a graph of various parameters of the internal combustion engine and the alternator as a function of time.

The field bridge 36 includes two MOSFETs 72, 74 and two diodes 76, 78. When the MOSFETs 72, 74 are conducting, current is allowed to build up in the field winding as is shown by arrow 80. The first MOSFET 72 of the field bridge 36 is used for pulse-width modulation of the voltage supplied to the rotor coil 18 while the second MOSFET 74 of the field bridge 36 completes the current path back to the battery 32. The second diode 78 of the field bridge 36 serves as a "free-wheeling" path for the field current when the first MOSFET 72 is switched off. During cranking of the alternator 10, the field bridge MOSFETs 72, 74 conduct at a high-duty cycle to maximize the current to the field windings, thus maximizing the torque produced for cranking. As the internal combustion engine fuels and ignition is initiated, the internal combustion engine starts and its speed rapidly increases. This rapid increase of speed overcomes the torque produced by the alternator 10. With the field current 80 at a high level, the alternator 10 starts to generate voltages high enough to overcome the voltage of the battery 32 and initiate charging of the battery 32. This leads to the unwanted drag on the internal combustion engine as it accelerates to idle speed. Referring to FIG. 2, this increase in voltage is represented by peaks in current 82 and voltage 84.

In operation, during the transition from the end of cranking to idling of the internal combustion engine, the MOSFETs 72, 74 of the field bridge 36 are switched off. This forces the field current to flow through the diodes 76, 78, thus applying a negative battery voltage across the field. This results in the field current rapidly decreasing to zero. This rapid decrease occurs typically in approximately 50 milliseconds. During this time period, the alternator 10 is able to deliver some power to the battery 32 based on the speed of the alternator 10 and the internally generated voltage. This generated power is, however, derived from the internal combustion engine and, thus, acts as a drag on the internal combustion engine during the starting process.

Continuing with the operation of the alternator 10, the inventive method further includes the step of turning on all of the upper 60, 62, 64 or lower 66, 68, 70 halves of MOSFETs of the inverter 30. While either half may be turned on or, the preferred embodiment contemplates the lower half 66, 68, 70 of MOSFETs being turned on at this point. This shorts the internally generated machine voltages. As the field current drops to zero MOSFETs 68–70 are turned off while the field current is gradually ramped to initiate a generation of a voltage to charge the battery 32 at a rate that is conducive to a smooth start of the internal combustion engine. The gate drivers 46 control the timing of the turning on and off of the MOSFETs in the inverter bridge 30. The turning off of the MOSFETs 66, 68, 70 occurs less than 50 milliseconds from the step of turning on the lower half switches 66, 68, 70.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A method for starting of an alternator (10) from an internal combustion engine (14) to charge a battery (32), wherein alternator (10) includes a field bridge (36), having first (72) and second (74) switches, and a multiphase inverter (30), having upper (60, 62, 64) and lower (66, 68, 70) halves of switches, the method comprising the steps of:
   providing a voltage from the battery (32) to the internal combustion engine (14);
   cranking the internal combustion engine (14);
   conducting the first (72) and second (74) switches to maximize the field current in the alternator (10);
   switching the first (72) and second (74) switches off to decrease the field current to zero; and
   turning on one of the upper (60, 62, 64) and lower (66, 68, 70) halves of switches of the multiphase inverter (30) to quicken the removal of the load from the alternator (10) to the internal combustion engine (14) to further reduce the amount of power consumed by the alternator (10) to allow the internal combustion engine (14) to reach the idling state.

2. A method as set forth in claim 1 including the step of turning off the one of the upper (60, 62, 64) and lower (66, 68, 70) halves of switches after the internal combustion engine (14) enters the idling state.

3. A method as set forth in claim 2 wherein the step of turning off the one of the upper (60, 62, 64) and lower (66, 68, 70) halves of switches occurs in less than 50 milliseconds from the step of turning on the one of the upper (60, 62, 64) and lower (66, 68, 70) halves of switches.

4. A method as set forth in claim 3 including the step of identifying when the internal combustion engine (14) is transitioning from a cranking state to an idling state.

5. A method as set forth in claim 4 wherein the step of identifying occurs prior to the step of switching.

* * * * *